(12) United States Patent
Anand et al.

(10) Patent No.: US 8,216,623 B2
(45) Date of Patent: Jul. 10, 2012

(54) FLAVOR INFUSED NUT SNACK

(75) Inventors: Ashish Anand, Plano, TX (US);
Barbara Vazquez del Mercado, Plano, TX (US); Mehrnaz Vafaie, Plano, TX (US)

(73) Assignee: Frito-Lay North America, Inc., Plano, TX (US)

( * ) Notice: Subject to any disclaimer, the term of this patent is extended or adjusted under 35 U.S.C. 154(b) by 254 days.

(21) Appl. No.: 12/419,723

(22) Filed: Apr. 7, 2009

(65) Prior Publication Data

US 2010/0255163 A1 Oct. 7, 2010

(51) Int. Cl.
*A23L 1/36* (2006.01)

(52) U.S. Cl. ........ 426/281; 426/523; 426/468; 426/289; 426/632

(58) Field of Classification Search .................. 426/281, 426/468
See application file for complete search history.

(56) References Cited

U.S. PATENT DOCUMENTS

| | | |
|---|---|---|
| 4,045,639 A | 8/1977 | Meisel |
| 4,341,803 A | 7/1982 | Koshida et al. |
| 4,418,083 A | 11/1983 | McKinney et al. |
| 4,882,851 A | 11/1989 | Wennerstrum et al. |
| 5,020,237 A | 6/1991 | Gross et al. |
| 5,135,122 A | 8/1992 | Gross et al. |
| 5,240,726 A | 8/1993 | Zook |
| 5,595,780 A | 1/1997 | Zook |
| 5,897,897 A * | 4/1999 | Porzio et al. ................ 426/96 |
| 5,962,057 A | 10/1999 | Durance et al. |
| 5,972,397 A | 10/1999 | Durance et al. |
| 6,312,745 B1 | 11/2001 | Durance et al. |
| 2006/0286234 A1 | 12/2006 | Tsai et al. |

FOREIGN PATENT DOCUMENTS

| | | |
|---|---|---|
| EP | 0408946 A2 | 1/1991 |
| EP | 0639748 A1 | 2/1995 |
| EP | 0717917 B1 | 2/1995 |
| EP | 1125177 A1 | 8/2001 |
| EP | 1289356 A1 | 12/2001 |
| EP | 1330623 B1 | 3/2002 |
| GB | 2343502 B | 5/2000 |
| WO | WO00/01244 | 1/2000 |
| WO | WO2008/025258 | 3/2008 |

OTHER PUBLICATIONS

Analysis of Volatile Components Derived from Raw and Roasted Earth Almond. J. Agric Food Chem 1997, 45, 1853-1860.*
Practical Applications of Vacuum Impregnation in Fruit and Vegetable Processing. Trends in Food Science & Technology 15 (2004) 434-451.*
Blanched Almonds. Available online at www.practicallyedible.com since Jul. 29, 2004.*

* cited by examiner

*Primary Examiner* — D. Lawrence Tarazano
*Assistant Examiner* — Assaf Zilbering
(74) *Attorney, Agent, or Firm* — Colin P. Cahoon; James R. Gourley; Carstens & Cahoon, LLP

(57) ABSTRACT

The present invention discloses formulations and methods for making an infused nut snack. Ingredient formula ranges and processing steps are disclosed that provide improved flavor, texture and appearance with the use of an aqueous flavoring solution applied to the nuts under vacuum conditions. The infused nuts are oil or dry roasted and then minimally topically flavored.

12 Claims, 1 Drawing Sheet

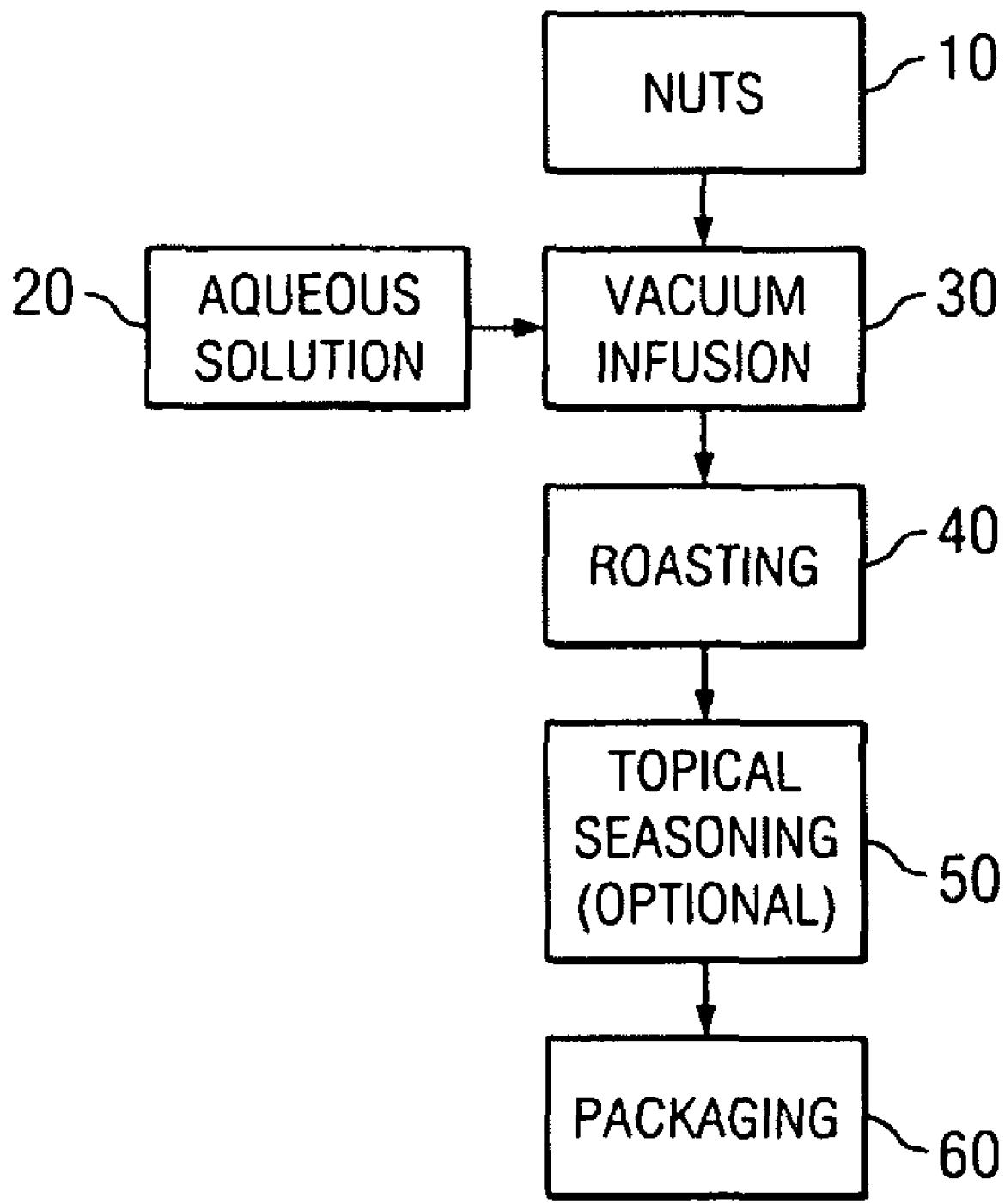

FLAVOR INFUSED NUT SNACK

BACKGROUND OF THE INVENTION

1. Technical Field

The present invention relates to a method for making an improved flavored nut and, more particularly, to a method for making a vacuum infused flavored nut snack using a water based slurry.

2. Description of Related Art

Snack items are an important consumer item for which there exists a great demand. Snacks can also play a large role in the diet of consumers. Peanuts, almonds and other types of nuts are preferred snack items because they are nutritious due to their high protein content. Many nuts also have high fiber content, which has been attributed to reducing a person's risk of certain cancers, diabetes, digestive disorders, and heart diseases. Fiber may also help people control obesity, because insoluble fiber is not digested and passes through the digestive system virtually in tact, providing bulk but very few calories. Studies have also shown that people who consume nuts on a regular basis are less likely to suffer from coronary heart disease and can lower their LDL cholesterol levels, probably due to the fatty acid profile of nuts. Thus, the nutritious benefits of nut-based snack chips serve to distinguish them from other types of snack chips.

Nuts can be consumed in their natural physical state, such as whole peanuts or cashews, or they can be flavored. In the prior art, whole nuts have been flavored topically with an oil and seasoning mixture. However, topical seasoning of whole nuts has several drawbacks. First, the oil-based topical seasoning easily sticks to the oily fingers of consumers. As such, some of the seasoning is lost before the snack product reaches the consumer's mouth. Second, a topical seasoning dissolves quickly in the mouth of the consumer. Consequently, the flavor tends to fade long before the consumer actually swallows the product. It would be an improvement in the art, therefore to provide a flavoring that is long lasting, and that does not adhere easily to the fingers of consumers. It would also be an improvement in the art to provide a product that reduces the amount of raw materials costs while increasing the final product quality.

SUMMARY OF THE INVENTION

The present invention provides a flavored nut made using vacuum infusion technology. Raw or blanched nut pieces, such as whole or pieces of peanuts, almonds or cashews, are first infused in a vacuum tumbler with an aqueous flavoring solution. The vacuum infusion occurs at a vacuum pressure level of between about 10 inHg and about 20 inHg. In one embodiment, three separate vacuum infusion cycles are used, with each cycle lasting between five and ten minutes. In one embodiment, the aqueous seasoning solution comprises a mixture of sugars, salt and other flavorings. Advantageously, the present invention avoids the use of substantial amounts of edible oil during vacuum infusion. The present invention also provides substantial savings in the amount of flavorings used to obtain products that are superior over prior art products. The infused nuts are oil roasted or dry roasted to a moisture content of less than about 3%. The roasted nuts are then optionally topically flavored with an oil based flavoring. The unique infusion steps allow less (if any) topical flavoring to be used than is used in the prior art while still maintaining improved product characteristics. These as well as additional features and advantages of the present invention will become apparent in the following written description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

FIG. 1 is a flowchart indicating the processing steps for one embodiment of the present invention.

DETAILED DESCRIPTION

The flavored nuts of the present invention are nuts that have been vacuum infused with an aqueous flavoring solution, oil roasted and topically flavored. The nuts of the present invention deliver longer lasting flavor, along with improved texture and nutritional value to the consumer.

As used herein, the term "nut" is used in the culinary sense and includes any large, oily kernel found within a shell and used in food. Examples of nuts include, without limitation, peanut, almond, pistachio, cashew, Brazil nut, pecan, hazelnut and walnut. The following disclosure will focus on almonds and peanuts, but this is not intended to limit the scope of the invention, as other varieties of nuts fall within the teachings disclosed herein. The nuts used herein are preferably whole, full-fat nuts, but the principles disclosed herein apply equally as well to other nuts, including nuts that are chopped or sliced, raw, blanched, unblanched, full-fat or partially defatted. The nuts that are preferably used in the present invention are any nuts which, in their raw form, contain 65% fat or less. In one preferred embodiment, the nuts are whole blanched almonds. In another preferred embodiment, the nuts are whole raw peanuts. All percentages used herein are by weight unless otherwise noted.

A flowchart indicating the method steps of one embodiment of the present invention is depicted in FIG. 1. In a first step, the nuts 10 are transferred into a vacuum tumbler and infused 30 with an aqueous flavoring solution 20. The vacuum tumbler is essentially a sealed vessel that is able to rotate and agitate the nuts inside. The vacuum tumbler also contains a sprayer that dispenses the aqueous flavoring solution into the interior of the vacuum tumbler during the infusion step. In a preferred embodiment, the pressure inside the vessel is reduced to less than about 20 inHg. In a most preferred embodiment, the pressure inside the vessel is between about 10 inHg and about 20 inHg. In another embodiment, the pressure level inside the vessel is between about 30% and about 70% of atmospheric pressure.

In another preferred embodiment, the aqueous flavoring solution is sprayed into the vessel in at least two stages during the infusion, and preferably three stages, with each stage approximately 5 to 10 minutes apart. The three stage infusion process was determined by the inventors herein to surprisingly provide a higher percentage of acceptable product using a lower percentage of flavoring solution than a single stage vacuum infusion using a higher percentage of flavoring solution. It has been found that dividing the dispensation of solution into three vacuum stages more effectively infuses the aqueous flavoring solutes into the pores of the nuts than using a single stage infusion process, surprisingly, even when larger amounts of flavoring solution is used in the single stage process. In one embodiment, the mixture of nuts and aqueous flavoring solution comprises between about 80% and about 95% nuts, and between about 5% and about 20% aqueous flavoring solution. The inventors herein have discovered that a mixture of nuts and aqueous flavoring solution of 95:5 infused in a three stage vacuum infusion process yields more acceptable final product than a 90:10 nut and flavoring solution mixture infused in a single stage vacuum infusion, even when the total infusion time remained the same between the two processes. The material cost savings from this discovery is a major improvement over the prior art. The vessel is rotated, in one embodiment continuously rotated, in order to agitate the nuts during the infusion process. In a preferred embodiment, the vacuum infusion occurs at a product temperature between about 130° F. and about 150° F.

In one embodiment, the nuts comprise blanched almonds, and the aqueous flavoring solution comprises at least about 20% water, at least about 28% honey, at least about 9% salt, and at between about 5% and about 9% of an encapsulated flavoring. In another embodiment, the aqueous flavoring solution also includes sugar. In still another embodiment, the aqueous flavoring solution comprises at least about 20% water, between about 28% and about 35% honey, between about 9% and about 21% salt, and between about 5% and about 9% encapsulated flavoring solution. In another embodiment, the nuts comprise raw peanuts, and the aqueous flavoring solution comprises at least about 75% water, at least about 9% salt, and between about 2% and about 7% encapsulated flavoring.

The encapsulated flavoring is generally a flavoring oil that has been encapsulated inside a yeast and carbohydrate, and which has a glass transition temperature below room temperature. The encapsulated flavoring generally comprises less than about 20% flavoring oil, which means the aqueous flavoring solution comprises no more than about 2% flavoring oil.

The infusion step is distinguishable from prior art infusion steps by the absence of a major fraction of edible oil in the infusion solution. Prior art methods utilize an infusion solution comprising an aqueous fraction and an oil-based fraction. Infusing the nuts with a significant edible oil based fraction causes the nuts to absorb far more oil during the infusion step than using a primarily aqueous based infusion solution. The prior art methods, thus, will vastly increase the amount of fat and calories in the final product. The fat content of the infused nuts in the present invention remains the same.

As stated previously, the only oil component in the present invention is the less than 2% encapsulated flavoring oil. Prior art solutions include flavoring oils in the edible oil fraction of the infusion solution, whereas the inventors herein have discovered that encapsulated flavoring oils can be included in an aqueous solution with superior results. In other words, the inventors herein have determined that, surprisingly, infused nuts can be created even when omitting the substantial oil-based fraction of prior art infusion solutions. The prior art indicates that the use of a substantial oil-based fraction contributes to the overall flavor and mouthfeel of the finished product. The present invention surprisingly achieves superior flavor without including the substantial oil based fraction.

In fact, surprisingly, the present invention has been found to reduce the amount of seasonings and flavorings (topical or infused) needed by more than 50% over prior art methods, while still producing a satisfactory product which is desirable by consumers. As seasonings and flavorings are typically an expensive raw material by weight, a 50% savings is a substantial improvement in the art. Prior art methods have coated nuts with flavoring oils at levels above 2% by weight. The present invention limits the application of topical flavoring oils to less than about 1% by weight, and in one embodiment, 0% by weight.

This infusion step is also distinguishable from prior art methods by using only a vacuum infusion step, and not following the vacuum infusion step with a high pressure infusion step. Superior results have occurred by omitting both the substantial edible oil fraction and the high pressure step used in the prior art. Omitting the high pressure step makes the process disclosed herein less time consuming and less expensive in terms of capital and operating cost.

The infused nuts absorb significant amounts of water during the infusion process. They are roasted 40, preferably oil roasted or dry roasted, after such infusion in order to reduce the moisture content of the nuts to less than about 3%. In a most preferred embodiment, the nuts are oil roasted. The oil roasting preferably occurs in sunflower oil at a temperature of between about 300° F. and about 350° F., for a dwell time of between about 2 minutes and about 5 minutes. In a preferred embodiment, the nuts are oil roasted by passing them through a heated oil bath using a perforated conveyor belt. In a most preferred embodiment, the oil used for the roasting step is recycled and filtered using active carbon filtration technology. Using recycled oil that has been filtered using active carbon is more economical and allows the same oil to be used to roast nuts with different infused flavors.

The roasting step also imparts a desirable brown color to the exterior of the almonds due to the Maillard browning reaction and carmelization of the sugars in the aqueous flavoring solution. Roasting oil also replaces some of the water content of the infused nuts, which produces a roasted nut with improved mouthfeel and taste. It has been experimentally determined that roasted, seasoned almonds have improved taste due to decreased levels of benzaldehyde and increased levels of pyrazines. In one embodiment, the levels of benzaldehyde in the finished product is less than about 70% of the level of benzaldehyde in the raw almond. In another embodiment, the levels of pyrazines in the finished product is at least 1000% higher than the levels of pyrazines in raw almonds. Pyrazines include, without limitation, methylpyrazine, 2,5-dimethylpyrazine, ethylpyrazine, 2-ethyl-6-methylpyrazine, 2,3,5-trimethylpyrazine, 3-ethyl-2,5-dimethylpyrazine and 2-ethyl-3,5-dimethylyrazine.

After roasting, the roasted nuts can then be coated 50 with a flavored oil coating. Because the nuts have been infused with flavorings, a lighter flavored oil coating can be used with the present invention than is desirable in the prior art. In a preferred embodiment of the present invention, the flavored oil coating can comprise 1% or less of the total weight of the nut. The topical flavoring can be applied by any method known in the art, including a standard tumbling seasoner.

After the nuts have cooled following the oil roasting step, they can be sent to be packaged 60.

EXAMPLE

The table below illustrates the ingredients and their relative amounts that were charged into a vacuum tumbler to make an infused almond according to the present invention:

TABLE I

| Ingredient | Wt. % Ingredients |
| --- | --- |
| Almonds (blanched) | 83.2% |
| Evaporated Sugar | 3.0% |
| Sea Salt | 1.8% |

TABLE I-continued

| Ingredient | Wt. % Ingredients |
| --- | --- |
| Water | 6.0% |
| Honey | 8% |
| Encapsulated Flavor | 1.0% |

The ingredients were transferred into a vacuum tumbler and the pressure inside the vacuum tumbler was decreased to about 20 inHg. The aqueous flavoring solution ingredients were added in three cycles during the infusion process, with an interval of 5 minutes between each cycle. Thus, the total infusion time was about 15 minutes.

The tumbler was then returned to atmospheric pressure, and the infused almonds were transferred to an oil fryer. The almonds were then oil roasted in sunflower oil at an oil temperature of about 325° F. for a dwell time of about 3 minutes. The moisture content of the roasted almonds was between about 2% and about 2.5%. The salt content of the roasted almonds was between about 0.5% and about 2%.

The almonds were then coated with a topical flavoring oil. The topical oil comprised about 1% of the total weight of the finished almond. The total oil content of the finished almond was between about 48% and about 50%.

What is claimed is:

1. A method of making a nut snack product, said method comprising:
    feeding a mixture of nuts and an aqueous flavoring solution into a vacuum tumbler, wherein said aqueous flavoring solution comprises water, salt, and less than about 3% edible oil, and wherein said aqueous flavoring solution comprises between about 5% and about 20% of said mixture;
    reducing a pressure inside said vacuum tumbler to less than about 70% of atmospheric pressure;
    tumbling said mixture inside said tumbler for at least about 10 minutes to create infused nuts; and
    roasting said infused nuts until said infused nuts comprise a moisture content of less than about 3% by weight to produce roasted, infused nuts.

2. The method of claim 1 wherein said nuts comprise blanched almonds and wherein said aqueous flavoring solution further comprises at least about 34% water, at least about 28% honey, at least about 9% salt, and at between about 5% and about 9% of encapsulated flavoring, wherein said encapsulated flavoring comprises less than about 20% oil.

3. The method of claim 1 wherein said feeding further comprises feeding said aqueous flavoring solution into said vacuum tumbler in at least two cycles, wherein said at least two cycles are between about 5 and about 10 minutes apart.

4. The method of claim 1 wherein said nuts comprise raw peanuts and wherein said aqueous flavoring solution further comprises at least about 75% water, at least about 9% salt, and between about 2% and about 7% of an encapsulated flavoring, wherein said encapsulated flavoring comprises less than about 20% oil.

5. The method of claim 1 further comprising:
    coating said roasted, infused nut with a topical oil flavoring, wherein said topical oil flavoring comprises less than 1% of the total weight of the roasted, infused nut.

6. The method of claim 1 wherein said roasting comprises oil roasting.

7. The method of claim 1 wherein said roasting comprises dry roasting.

8. The method of claim 1 wherein said reducing further comprises reducing said pressure inside said vacuum tumbler to between about 30% and about 70% of atmospheric pressure.

9. The method of claim 1 wherein said reducing further comprises reducing said pressure inside said vacuum tumbler to less than about 20 inHg.

10. The method of claim 1 wherein said reducing further comprises reducing said pressure inside said vacuum tumbler to a between about 10 inHg and about 20 inHg.

11. The method of claim 1 wherein said nuts comprise almonds, and said method further comprises reducing a level of benzaldehyde in said roasted nuts by at least 30% than the level of benzaldehyde in the raw nut.

12. The method of claim 1 further comprising increasing a level of pyrazines in said roasted nuts by at least 1000% than the level of pyrazines in the raw nut.

* * * * *